US008840995B2

(12) United States Patent
Kadam et al.

(10) Patent No.: US 8,840,995 B2
(45) Date of Patent: Sep. 23, 2014

(54) LIGNIN PRODUCTION FROM LIGNOCELLULOSIC BIOMASS

(71) Applicant: Renmatix, Inc., King of Prussia, PA (US)

(72) Inventors: Kiran Kadam, Golden, CO (US); Michael A. Simard, Berwyn, PA (US); Andrew Theodore Champagne, Marietta, GA (US)

(73) Assignee: Renmatix, Inc., King of Prussia, PA (US)

( * ) Notice: Subject to any disclaimer, the term of this patent is extended or adjusted under 35 U.S.C. 154(b) by 0 days.

(21) Appl. No.: 14/045,327

(22) Filed: Oct. 3, 2013

(65) Prior Publication Data

US 2014/0030524 A1 Jan. 30, 2014

Related U.S. Application Data

(63) Continuation of application No. 13/464,275, filed on May 4, 2012, now Pat. No. 8,663,800.

(60) Provisional application No. 61/482,479, filed on May 4, 2011.

(51) Int. Cl.
*B32B 5/16* (2006.01)

(52) U.S. Cl.
USPC ............. 428/402; 428/532; 530/500; 162/14

(58) Field of Classification Search
USPC ...................... 428/402, 532; 162/14; 530/500
See application file for complete search history.

(56) References Cited

U.S. PATENT DOCUMENTS

| | | |
|---|---|---|
| 1,783,163 A | 11/1930 | Griswold |
| 1,938,802 A | 12/1933 | Braun |
| 1,959,433 A | 5/1934 | Leetscher |
| 2,156,159 A | 4/1939 | Olson et al. |
| 2,198,785 A | 4/1940 | Mohr |
| 2,356,500 A | 8/1944 | Boinot |
| 2,516,833 A | 8/1950 | Ant-Wuorinen |
| 2,727,869 A | 6/1953 | Lambuth |
| 2,681,871 A | 6/1954 | Wallace |
| 2,759,856 A | 8/1956 | Saums |
| 2,781,328 A | 2/1957 | Ayers |
| 2,801,939 A | 8/1957 | Hignett |
| 2,810,394 A | 10/1957 | Ferguson |
| 2,822,784 A | 2/1958 | Heller |
| 2,881,783 A | 4/1959 | Andrews |
| 2,994,633 A | 8/1961 | Clark |
| 2,997,466 A | 8/1961 | Ball et al. |
| 3,212,932 A | 10/1965 | Hess |
| 3,282,869 A | 11/1966 | Bryner |
| 3,314,797 A | 4/1967 | Hess |
| 3,792,719 A | 2/1974 | Dickinson |
| 3,990,904 A | 11/1976 | Friese et al. |
| 4,100,016 A | 7/1978 | Diebold et al. |
| 4,105,467 A | 8/1978 | Buckl et al. |
| 4,201,596 A | 5/1980 | Church et al. |
| 4,308,200 A | 12/1981 | Fremont |
| 4,316,747 A | 2/1982 | Rugg et al. |
| 4,316,748 A | 2/1982 | Rugg et al. |
| 4,318,748 A | 3/1982 | Church |
| 4,338,199 A | 7/1982 | Modell |
| 4,357,194 A | 11/1982 | Stofko |
| 4,363,671 A | 12/1982 | Rugg et al. |
| 4,366,322 A | 12/1982 | Raymond |
| 4,368,079 A | 1/1983 | Rugg et al. |
| 4,405,377 A | 9/1983 | Neuzil |
| 4,409,032 A | 10/1983 | Paszner et al. |
| 4,427,453 A | 1/1984 | Reitter |
| 4,468,256 A | 8/1984 | Hinger |
| 4,470,851 A | 9/1984 | Paszner et al. |
| 4,493,797 A | 1/1985 | Avedesian |
| 4,520,105 A | 5/1985 | Sinner et al. |
| 4,535,593 A | 8/1985 | Sakka |
| 4,543,190 A | 9/1985 | Modell |
| 4,556,430 A | 12/1985 | Converse et al. |
| 4,607,819 A | 8/1986 | Spils |
| 4,612,286 A | 9/1986 | Sherman et al. |
| 4,637,835 A | 1/1987 | Nagle |
| 4,644,060 A | 2/1987 | Chou |
| 4,645,541 A | 2/1987 | DeLong |
| 4,674,285 A | 6/1987 | Durrant et al. |
| 4,675,198 A | 6/1987 | Sevenants |
| 4,699,124 A | 10/1987 | Nagle |
| 4,742,814 A | 5/1988 | Sinner et al. |
| 4,764,596 A | 8/1988 | Lora et al. |

(Continued)

FOREIGN PATENT DOCUMENTS

| | | |
|---|---|---|
| AU | 2002234469 B2 | 7/2007 |
| CA | 1010859 A1 | 5/1977 |

(Continued)

OTHER PUBLICATIONS http://www.astm.org/Standards/_E1755.htm, retrieved from the internet at least as early as May 16, 2012.
"Lignin and its properties: Glossary of Lignin Nomenclature", Dialogue/Newsletters, vol. 9, No. 1, Lignin Institute, Jul. 2001, retrieved from the internet at least as early as May 16, 2012.
"The Alternative Energy Magazine", http://www.altenergymag.com/emagazine/2009/06/lignin-as-alternative-renewable-fuel/1384), retrieved from the internet at least as early as May 16, 2012.
U.S. Appl. No. 13/464,275, Non Final Office Action, mailed Jun. 21, 2013, 6 pages.
U.S. Appl. No. 13/472,798, Final Office Action, mailed Dec. 3, 2012, 10 pages.
U.S. Appl. No. 13/472,798, Non-Final Office Action, Apr. 17, 2013, 12 pages.
U.S. Appl. No. 13/472,798, Non-Final Office Action, Aug. 7, 2012, 12 pages.
U.S. Appl. No. 13/472,798, Final Office Action, Oct. 29, 2013, 27 pages.
U.S. Appl. No. 13/479,852, Non-Final Office Action, Oct. 12, 2012, 9 pages.

(Continued)

*Primary Examiner* — Leszek Kiliman
(74) *Attorney, Agent, or Firm* — Travis B. Gasa; Ballard Spahr LLP

(57) ABSTRACT

Methods are disclosed for preparing lignin from lignocellulosic biomass using rapid full or partial pressure reduction to separate and pulverize the lignin without fouling the equipment and with improved energy recovery.

18 Claims, 3 Drawing Sheets

(56) References Cited

U.S. PATENT DOCUMENTS

| | | | |
|---|---|---|---|
| 4,857,638 A | 8/1989 | Yalpani et al. | |
| 4,946,946 A | 8/1990 | Fields et al. | |
| 4,964,995 A | 10/1990 | Chum et al. | |
| 5,009,746 A | 4/1991 | Hossain et al. | |
| 5,041,192 A | 8/1991 | Sunol et al. | |
| 5,125,977 A | 6/1992 | Grohmann et al. | |
| 5,169,687 A | 12/1992 | Sunol | |
| 5,196,460 A * | 3/1993 | Lora et al. | 524/76 |
| 5,213,660 A | 5/1993 | Hossain et al. | |
| 5,328,934 A | 7/1994 | Schiraldi | |
| 5,338,366 A | 8/1994 | Grace et al. | |
| 5,411,594 A | 5/1995 | Brelsford | |
| 5,424,417 A | 6/1995 | Torget et al. | |
| 5,503,996 A | 4/1996 | Torget et al. | |
| 5,512,231 A | 4/1996 | Thies et al. | |
| 5,516,952 A | 5/1996 | Lee et al. | |
| 5,536,325 A | 7/1996 | Brink | |
| 5,558,783 A | 9/1996 | McGuinness | |
| 5,615,708 A | 4/1997 | Barron | |
| 5,628,830 A | 5/1997 | Brink | |
| 5,705,369 A | 1/1998 | Torget et al. | |
| 5,788,812 A | 8/1998 | Agar et al. | |
| 5,811,527 A | 9/1998 | Ishitoku et al. | |
| 5,824,187 A | 10/1998 | Richter et al. | |
| 5,830,763 A | 11/1998 | Junk et al. | |
| 5,980,640 A | 11/1999 | Nurmi et al. | |
| 6,022,419 A | 2/2000 | Torget et al. | |
| 6,025,452 A | 2/2000 | Kurple | |
| 6,090,291 A | 7/2000 | Akai et al. | |
| 6,180,845 B1 | 1/2001 | Catallo et al. | |
| 6,228,177 B1 | 5/2001 | Torget | |
| 6,419,788 B1 | 7/2002 | Wingerson | |
| 6,555,350 B2 | 4/2003 | Ahring et al. | |
| 6,569,640 B1 | 5/2003 | Castor et al. | |
| 6,642,396 B1 | 11/2003 | Zeitsch et al. | |
| 6,743,928 B1 | 6/2004 | Zeitsch | |
| 6,872,316 B2 | 3/2005 | Heikkila et al. | |
| 6,878,212 B1 | 4/2005 | Pinatti et al. | |
| 6,921,820 B2 | 7/2005 | Arai et al. | |
| 6,929,752 B2 | 8/2005 | Cansell | |
| 7,189,306 B2 | 3/2007 | Gervais | |
| 7,238,242 B2 | 7/2007 | Pinatti et al. | |
| 7,259,231 B2 | 8/2007 | Cornish et al. | |
| 7,262,331 B2 | 8/2007 | van de Beld et al. | |
| 7,476,296 B2 | 1/2009 | Appel et al. | |
| 7,547,539 B2 | 6/2009 | Ikegami et al. | |
| 7,566,383 B2 | 7/2009 | Everett et al. | |
| 7,585,652 B2 | 9/2009 | Foody et al. | |
| 7,649,086 B2 | 1/2010 | Belanger et al. | |
| 7,666,637 B2 | 2/2010 | Nguyen | |
| 7,670,813 B2 | 3/2010 | Foody et al. | |
| 7,754,457 B2 | 7/2010 | Foody et al. | |
| 7,771,699 B2 | 8/2010 | Adams et al. | |
| 7,955,508 B2 | 6/2011 | Allan et al. | |
| 7,960,325 B2 | 6/2011 | Kluko | |
| 8,030,039 B1 | 10/2011 | Retsina et al. | |
| 8,057,639 B2 | 11/2011 | Pschorn et al. | |
| 8,119,823 B2 | 2/2012 | Kilambi | |
| 8,282,738 B2 | 10/2012 | Kilambi et al. | |
| 8,317,928 B1 * | 11/2012 | Iyer et al. | 127/57 |
| 8,404,051 B2 * | 3/2013 | Iyer et al. | 127/57 |
| 2001/0050096 A1 | 12/2001 | Costantini et al. | |
| 2002/0061583 A1 | 5/2002 | Kawamura et al. | |
| 2002/0069987 A1 | 6/2002 | Pye | |
| 2003/0156970 A1 | 8/2003 | Oberkofler et al. | |
| 2003/0221361 A1 | 12/2003 | Russell et al. | |
| 2004/0020854 A1 | 2/2004 | Ali et al. | |
| 2004/0231661 A1 | 11/2004 | Griffin et al. | |
| 2005/0065336 A1 | 3/2005 | Karstens | |
| 2007/0108036 A1 | 5/2007 | Siskin et al. | |
| 2007/0148751 A1 | 6/2007 | Griffin et al. | |
| 2007/0161095 A1 | 7/2007 | Gurin | |
| 2007/0217980 A1 | 9/2007 | Garcia-Ortiz et al. | |
| 2007/0254348 A1 | 11/2007 | Retsina et al. | |
| 2007/0259412 A1 | 11/2007 | Belanger et al. | |
| 2007/0267008 A1 | 11/2007 | Funazukuri et al. | |
| 2008/0015336 A1 | 1/2008 | Cornish et al. | |
| 2008/0029233 A1 | 2/2008 | Wingerson et al. | |
| 2008/0032344 A1 | 2/2008 | Fallavollita | |
| 2008/0051566 A1 | 2/2008 | Ohman et al. | |
| 2008/0292766 A1 | 11/2008 | Hoffman et al. | |
| 2008/0295981 A1 | 12/2008 | Shin et al. | |
| 2008/0302492 A1 | 12/2008 | Shin et al. | |
| 2009/0023187 A1 | 1/2009 | Foody et al. | |
| 2009/0038212 A1 | 2/2009 | Cooper | |
| 2009/0056201 A1 | 3/2009 | Morgan | |
| 2009/0118477 A1 | 5/2009 | Hallberg et al. | |
| 2009/0176286 A1 | 7/2009 | O'Connor et al. | |
| 2009/0176979 A1 | 7/2009 | Hara et al. | |
| 2009/0205546 A1 | 8/2009 | Kluko | |
| 2009/0221814 A1 | 9/2009 | Pschorn et al. | |
| 2009/0223612 A1 | 9/2009 | McKnight et al. | |
| 2009/0229599 A1 | 9/2009 | Zhang | |
| 2009/0232892 A1 | 9/2009 | Yamasaki et al. | |
| 2009/0288788 A1 | 11/2009 | Castor | |
| 2010/0004119 A1 | 1/2010 | Gadkaree et al. | |
| 2010/0012583 A1 | 1/2010 | Stuart | |
| 2010/0043782 A1 | 2/2010 | Kilambi | |
| 2010/0048884 A1 | 2/2010 | Kilambi | |
| 2010/0048924 A1 | 2/2010 | Kilambi | |
| 2010/0055629 A1 | 3/2010 | McKnight et al. | |
| 2010/0063271 A1 | 3/2010 | Allan et al. | |
| 2010/0069626 A1 | 3/2010 | Kilambi | |
| 2010/0077752 A1 | 4/2010 | Papile | |
| 2010/0081798 A1 | 4/2010 | Balensiefer et al. | |
| 2010/0136634 A1 | 6/2010 | Kratochvil et al. | |
| 2010/0136642 A1 | 6/2010 | Belanger et al. | |
| 2010/0146842 A1 | 6/2010 | Dumenil | |
| 2010/0146843 A1 | 6/2010 | Dumenil | |
| 2010/0152509 A1 | 6/2010 | Ekman | |
| 2010/0159569 A1 | 6/2010 | Medoff et al. | |
| 2010/0170504 A1 | 7/2010 | Zhang | |
| 2010/0175690 A1 | 7/2010 | Nagahama et al. | |
| 2010/0184151 A1 | 7/2010 | Tolan et al. | |
| 2010/0203605 A1 | 8/2010 | Kim et al. | |
| 2010/0233771 A1 | 9/2010 | McDonald et al. | |
| 2010/0269990 A1 | 10/2010 | Dottori et al. | |
| 2010/0279361 A1 | 11/2010 | South et al. | |
| 2010/0305242 A1 * | 12/2010 | Balakshin et al. | 524/74 |
| 2010/0326610 A1 | 12/2010 | Harvey et al. | |
| 2010/0329938 A1 | 12/2010 | Allan et al. | |
| 2010/0330638 A1 | 12/2010 | Aita et al. | |
| 2011/0021743 A1 | 1/2011 | Cornish et al. | |
| 2011/0076724 A1 | 3/2011 | Dumenil | |
| 2011/0079219 A1 | 4/2011 | McDonald et al. | |
| 2011/0100359 A1 | 5/2011 | North | |
| 2011/0126448 A1 | 6/2011 | Dumenil | |
| 2011/0137085 A1 | 6/2011 | Trahanovsky et al. | |
| 2011/0151516 A1 | 6/2011 | Van Der Heide et al. | |
| 2011/0165643 A1 | 7/2011 | Retsina et al. | |
| 2011/0171709 A1 | 7/2011 | Bardsley | |
| 2011/0192560 A1 | 8/2011 | Heikkila et al. | |
| 2011/0232160 A1 | 9/2011 | Siskin et al. | |
| 2011/0237838 A1 | 9/2011 | Zmierczak et al. | |
| 2011/0239973 A1 | 10/2011 | Qin | |
| 2011/0253326 A1 | 10/2011 | Sherman et al. | |
| 2011/0287502 A1 | 11/2011 | Castor | |
| 2011/0294991 A1 | 12/2011 | Lake et al. | |
| 2012/0103325 A1 | 5/2012 | Koenig et al. | |
| 2012/0108798 A1 | 5/2012 | Wenger et al. | |
| 2012/0116063 A1 | 5/2012 | Jansen et al. | |
| 2012/0145094 A1 | 6/2012 | Simard | |
| 2012/0146784 A1 | 6/2012 | Hines et al. | |
| 2012/0184788 A1 | 7/2012 | Loop et al. | |
| 2012/0279496 A1 | 11/2012 | Tao | |
| 2012/0279573 A1 | 11/2012 | Simard et al. | |
| 2012/0279579 A1 | 11/2012 | Simard et al. | |
| 2012/0282465 A1 | 11/2012 | Kadam et al. | |
| 2012/0282466 A1 | 11/2012 | Iyer et al. | |
| 2012/0282467 A1 | 11/2012 | Iyer et al. | |
| 2012/0282655 A1 | 11/2012 | Gibbs | |
| 2012/0282656 A1 | 11/2012 | Gibbs | |
| 2012/0285445 A1 | 11/2012 | Kilambi et al. | |

(56) References Cited

U.S. PATENT DOCUMENTS

| | | |
|---|---|---|
| 2012/0291774 A1 | 11/2012 | Kilambi et al. |
| 2013/0172540 A1 | 7/2013 | Simard et al. |
| 2013/0239954 A1* | 9/2013 | Kilambi et al. ............... 127/36 |

FOREIGN PATENT DOCUMENTS

| | | |
|---|---|---|
| CA | 1284637 | 6/1991 |
| CA | 2701194 | 10/2010 |
| CN | 1680415 A | 10/2005 |
| CN | 1931866 A | 3/2007 |
| CN | 101200479 A | 6/2008 |
| CN | 101613970 A | 12/2009 |
| CN | 101736631 | 6/2010 |
| CN | 101787398 A | 7/2010 |
| CN | 101886143 A | 11/2010 |
| CN | 102239184 A | 11/2011 |
| CZ | 225851 | 3/1984 |
| DE | 3225074 A1 | 1/1984 |
| DE | 10259928 A1 | 7/2004 |
| EA | 200700715 | 10/2007 |
| EP | 0037912 A2 | 10/1981 |
| EP | 1194226 A2 | 4/2002 |
| EP | 1364072 A2 | 11/2003 |
| EP | 1527204 A1 | 5/2005 |
| EP | 1836181 A1 | 9/2007 |
| GB | 291991 A | 6/1928 |
| GB | 692284 A | 6/1953 |
| GB | 1245486 A | 9/1971 |
| GB | 1569138 A | 6/1980 |
| GB | 2145090 | 3/1985 |
| JP | 50145537 | 11/1975 |
| JP | 56045754 | 4/1981 |
| JP | 57061083 | 4/1982 |
| JP | 62283988 | 12/1987 |
| JP | 11226385 | 8/1999 |
| JP | 2001095594 A | 4/2001 |
| JP | 2001262162 A | 9/2001 |
| JP | 2003212888 A | 7/2003 |
| JP | 2005040025 A | 2/2005 |
| JP | 2005296906 A | 10/2005 |
| JP | 2006223152 A | 8/2006 |
| JP | 2006255676 | 9/2006 |
| JP | 2006263527 A | 10/2006 |
| JP | 2007313476 A | 12/2007 |
| JP | 2008011753 A | 1/2008 |
| JP | 2008035853 A | 2/2008 |
| JP | 04197192 B2 | 12/2008 |
| JP | 2008292018 A | 12/2008 |
| JP | 2009189291 A | 8/2009 |
| JP | 2010042604 | 2/2010 |
| JP | 201132388 | 2/2011 |
| KR | 2009030967 | 3/2009 |
| KR | 20090039470 A | 4/2009 |
| KR | 20100032242 A | 3/2010 |
| RU | 2338769 | 11/2008 |
| RU | 2371002 C1 | 10/2009 |
| SU | 1086046 | 4/1984 |
| WO | WO-8300370 A1 | 2/1983 |
| WO | WO-8301958 | 6/1983 |
| WO | 9714747 | 4/1997 |
| WO | WO97/14747 * | 4/1997 |
| WO | WO-9714747 A1 | 4/1997 |
| WO | WO-9817727 A1 | 4/1998 |
| WO | WO-9923260 A1 | 5/1999 |
| WO | WO-9967409 A1 | 12/1999 |
| WO | 0061276 | 10/2000 |
| WO | 0132715 | 5/2001 |
| WO | WO-0160752 A1 | 8/2001 |
| WO | WO-0204524 A1 | 1/2002 |
| WO | WO-02070753 A2 | 9/2002 |
| WO | 2004013409 | 2/2004 |
| WO | 2007009463 | 1/2007 |
| WO | WO-2007056701 A2 | 5/2007 |
| WO | 2007120210 | 10/2007 |
| WO | WO-2008026932 A1 | 3/2008 |
| WO | WO-2008036500 A2 | 3/2008 |
| WO | WO-2008050740 A1 | 5/2008 |
| WO | WO-2008121043 A1 | 10/2008 |
| WO | WO-2008143078 A1 | 11/2008 |
| WO | WO-2009015409 A1 | 2/2009 |
| WO | 2009060126 | 5/2009 |
| WO | WO-2009108773 A2 | 9/2009 |
| WO | WO-2010009343 A2 | 1/2010 |
| WO | 2010034055 | 4/2010 |
| WO | 2010045576 | 4/2010 |
| WO | WO2010/045576 * | 4/2010 |
| WO | WO-2010046532 A1 | 4/2010 |
| WO | WO-2010069516 A2 | 6/2010 |
| WO | WO-2010113129 A2 | 10/2010 |
| WO | WO-2010121367 A1 | 10/2010 |
| WO | 2011007369 | 1/2011 |
| WO | WO-2011002822 A1 | 1/2011 |
| WO | 2011091044 | 7/2011 |
| WO | 2011094859 | 8/2011 |
| WO | 2012151509 | 11/2012 |
| WO | WO-2012151521 A2 | 11/2012 |
| WO | WO-2012151526 A2 | 11/2012 |
| WO | WO-2012151529 A2 | 11/2012 |
| WO | WO-2012151531 A2 | 11/2012 |
| WO | WO-2012151536 A2 | 11/2012 |
| WO | 2012151524 | 3/2013 |
| WO | 2013101397 | 7/2013 |

OTHER PUBLICATIONS

Boerjan et al., "Lignin biosynthesis", Ann. Rev. Plant Bio., 54(1), Jun. 2003, 519-549.

Ehara et al., "Characterization of the lignin-derived products from wood as treated in supercritical water", Journal of Wood Science, vol. 48, No. 4, Aug. 2002, pp. 320-325.

Ehrman, "Methods for the chemical analysis of biomass process streams", Handbook on Bioethanol, 1996, pp. 395-415.

Hosaka, "Filtration of lignin in hydrolysis solution", Hiroshima Daigaku Suichikusangakubu Kiyo, 17(1), 1978, pp. 17-25.

Jiang et al., "A method for quick analysis of biomass chemical composition from element analysis", Huagong Xuebao (Chinese Edition), 61(6), 2010, pp. 1506-1509.

Li et al., "Study on the recovery of lignin from black liquor by ultrafiltration", Huaxue Gongcheng, 31(1), 2003, pp. 49-52.

Marone et al., "Comminution of hydrolytic lignin in a jet mill", Gidroliznaya i Lesokhimicheskaya Promyshlennost, (6), 1991, pp. 14-15.

Nunn et al., "Product compositions and kinetics in the rapid pyrolysis of milled wood lignin", Industrial & Engineering Chemistry Process Design and Development, vol. 24, Jul. 1985, pp. 844-852.

International Patent Application No. PCT/US2012/036566, International Search Report and Written Opinion, mailed Nov. 28, 2012, 8 pages.

International Patent Application No. PCT/US2012/036591, International Search Report and Written Opinion, mailed Nov. 30, 2012, 11 pages.

International Patent Application No. PCT/US2012/067535, International Search Report and Written Opinion, mailed Feb. 20, 2013, 10 pages.

Ralph et al., "Elucidation of new structures in lignins of CAD- and COMT-deficient plants by NMR", Phytochem. 57(6), 2001, 993-1003.

Russian Patent Application No. 2012154207, Decision to Grant, received Oct. 17, 2013, 17 pages.

Shikinaka et al., "Polyfunctional nanometric particles obtained from lignin, a woody biomass resource", Green Chemistry, 12(11), 2010, pp. 1914-1916.

Sluiter et al., "Determination of Ash in Biomass", Laboratory Analytical Procedure, National Renewable Energy Laboratory, downloaded from http://www.astm.org/Standards/ E1755.htm, Jul. 17, 2005.

Sokolov et al., "Activation of hydrolytic lignin obtained from corncobs", Kozharska i Obuvna Promishlenost, 13(6), 1972, pp. 13-23.

Sukhanovskii et al., "The chemical composition of the organic part and of ash in hydrolysis lignins", Gidroliznaya i Lesokhimicheskaya Promyshlennost, 18(5), 1965, pp. 15-17.

(56) References Cited

OTHER PUBLICATIONS

Svitel'Skii, "Study of ash in lignin from kraft mill effluents", Mater. Nauch.-Tekh. Konf. Leningrad. Lesotekh. Akad., No. 4, 1966, pp. 180-185.
"Evaluation of materials for use in letdown valves and coal feed pumps for coal liquefaction service", Electr Power Res Inst Rep EPRIAF, No. 579, 1978, 94 (Abstract).
"Evaluation of materials for use in letdown valves and coal liquefaction service", Annual Conference on Materials for Coal Conversion and Utilization (CONF-791014), Oct. 9-11, 1979 (Abstract).
"Merriam-Webster Dictionary, "Quench-Definition"", document available at: <http://www.merriam-webster.com/dictionary/quench>, Retrieved on Feb. 9, 2012, 1.
Adschiri et al., "Noncatalytic Conversion of Cellulose in Supercritical and Sub-Critical Water", Journal of Chemical Engineering of Japan, 1993, 26(6): 676-680.
Adschiri et al., "Cellulose hydrolysis in supercritical water to recover chemicals", Reaction Engineering for Pullution Prevention, 2000, 205-220.
Arai et al., "Biomass conversion in supercritical water for chemical recycle", Enerugi, Shigen, 16(2), 1995, 175-180.
Baek et al., "Optimization of the pretreatment of rice straw hemicellulosic hydrolyzates for microbial production of xylitol", Biotechnology and Bioprocess Engineering, 12(4), 2007, 404-409(Abstract).
Balhouse , "Design, fabrication, and evaluation of a spiral-flow letdown valve", Electric Power Research Institute, Advanced Power Systems Division, EPRI AP, 1981(Abstract).
Ballesteros et al., "Fractionation of *Cynara cardunculus* (cardoon) biomass by dilute-acid pretreatment", Applied Biochemistry and Biotechnology, 137-140, 2007, 239-252 (Abstract).
Bennett et al., "Chemicals from Forest Products by Supercritical Fluid Extraction", Fluid Phase Equil., 1983, 10:337.
Bicker et al., "Catalytic conversion of carbohydrates in subcritical water: A new chemical process for lactic acid production", Journal of Molecular Catalysis A: Chemical, 2005, 239:151-157.
Bobleter , "Hydrothermal Degradation and Fractionation of Saccharides and Polysaccharides", 1998.
Boocock et al., "Liquefaction of Biomass by Rapid Hydrolysis", Can. J. Chem. Eng., 1983, 61:80.
Bustos et al., "Modeling of the hydrolysis of sugar cane bagasse with hydrochloric acid", Applied Biochemistry and Biotechnology, 104(1), 2003, 51-68 (Abstract).
Carrasco et al., "SO2-catalyzed steam pretreatment and fermentation of enzymatically hydrolyzed sugarcane bagasse", Enzyme and Microbial Technology, 46(2), 2010, 64-73 (Abstract).
Carrasco et al., "Effects of dilute acid and steam explosion pretreatments on the cellulose structure and kinetics of cellulosic fraction hydrolysis by dilute acids in lignocellulosic materials", Applied Biochemistry and Biotechnology, 45-46, 1994, 23-34 (Abstract).
Carvalho et al., "Sugarcane bagasse hydrolysis with phosphoric and sulfuric acids and hydrolysate detoxification for xylitol production", Journal of Chemical Technology and Biotechnology, 79(11), 2004, 1308-1312 (Abstract).
Chamblee et al., "Reversible in situ acid formation for β-pinene hydrolysis using CO2 expanded liquid and hot water", Green Chemistry, 2004, vol. 6, 382-386.
Chen et al., "Study on dilute-acid pretreatment of corn stalk", Linchan Huaxue Yu Gongye, 29(2), 2009, 27-32 (Abstract).
Conner et al., "Carbohydrate Modified Phenol-Formaldehyde Resins", vol. 6(4): 1986, 591-613.
Converti et al., "Wood hydrolysis and hydrolyzate detoxification for subsequent xylitol production", Chemical Engineering & Technology, 23(11), 2000, 1013-1020 (Abstract).
Dias et al., "Dehydration of xylose into fufural over micro-mesoporous sulfonic acid catalysts", Journal of Catalysis, 2005, vol. 229, 414-423.
Do Egito De Paiva et al., "Optimization of D-xylose, L-arabinose and D-glucose production obtained from sugar cane bagasse hydrolysis process", Brazilian Symposium on the Chemistry of Lignins and Other Wood Components, 6th, 2001, 333-337 (Abstract).
Dogaris et al., "Hydrothermal processing and enzymatic hydrolysis of sorghum bagasse for fermentable carbohydrates production", Bioresource Technology, 100(24), 2009, 6543-6549 (Abstract).
Eckert et al., "Supercritical fluid processing", Environmental Science and Technology, 1986, 20: 319-325.
Ehara et al., "A comparative study on chemical conversion of cellulose between the batch-type and flow-type in supercritical water", Cellulose, 2002, vol. 9, 301-311.
Ehara , "Chemical conversion of woody biomass by supercritical water", Graduate School of Energy Science, Kyoto University, Kyoto Japan.
Ehara et al., "Decomposition behavior of cellulose in supercritical water, subcritical water, and their combined treatments", J. Wood Sci., vol. 51, 2005, 148-153.
Erzengin et al., "Liquefaction of Sunflower Stalk by Using Supercritical Extraction", Energy Conversion and Management, Elsevier Science Publishers, Oxford, GB, Aug. 1998, 39:11, 1203-1206.
Garrote et al., "Manufacture of xylose-based fermentation media from corncobs by posthydrolysis of autohydrolysis liquors", Applied Biochemistry and Biotechnology, 95(3), 2001, 195-207 (Abstract).
Geddes et al., "Optimizing the saccharification of sugar cane bagasse using dilute phosphoric acid followed by fungal celluloses", Bioresource Technology, 101(6), 2010, 1851-1857 (Abstract).
Gong et al., "Study on hydrolysis and saccharification of microcrystalline cellulose in supercritical water", Xiandai Huagong, 30(2), 2010, 44-47 (Abstract).
Guirong et al., "Cellulose decomposition behavior in hot-compressed aprotic solvents", Science in China Series B: Chemistry, May 2008, vol. 51, No. 5, 479-486.
Hamelinck et al., "Ethanol from lignocellulosic biomass: techno-economic performance in short-, middle- and long-term", Biomass and Bioenergy, vol. 28, 2005, 384-410.
Harmer et al., "A new route to high yield sugars from biomass: phosphoric-sulfuric acid", Chemical Communications, vol. 43, 2009, 6610-6612 (Abstract).
Herrera et al., "Production of Xylose from Sorghum Straw Using Hydrochloric Acid", Journal of Cereal Science, 37(3), 2003, 267-274 (Abstract).
Holgate et al., "Glucose Hydrolysis and Oxidation in Supercritical Water", AIChE Journal, 1995, 41(3), 637-648.
Hosaka , "Filtration of lignin in hydrolysis solution", Hiroshima Daigaku Suichikusangakubu Kiyo, 17(1), 1978, 17-25 (Abstract).
Houghton et al., "Reactivity of Some Organic Compounds with Supercritical Water", Fuel, 1986, 61:827.
Ioannidou et al., "Direct determination of toxic trace metals in honey and sugars using inductively coupled plasma atomic emission spectrometry", Talanta, 65(1), 2005, 92-97.
Jensen et al., "Effects of dilute acid pretreatment conditions on enzymatic hydrolysis monomer and oligomer sugar yields for aspen, balsam, and switchgrass", Bioresource Technology, 101(7), 2010, 2317-2325 (Abstract).
Jeong et al., "Optimizing dilute-acid pretreatment of rapeseed straw for extraction of hemicellulose", Applied Biochemistry and Biotechnology, 161(1-8), 2010, 22-33 (Abstract).
Kamada et al., "(Development of letdown valve on pilot plant", Sekitan Kagaku Kaigi Happyo Ronbunshu, 35th, 1998, 459-462 (Abstract).
Kamm et al., "Principles of biorefineries", Appl. Microbiol. Biotechnol, vol. 64., 2004, 137-145.
Karimi et al., "Conversion of rice straw to sugars by dilute-acid hydrolysis", Biomass and Bioenergy, 30(3), 2006, 247-253 (Abstract).
Kim et al., "Selective Synthesis of Furfural from Xylose with Supercritical Carbon Dioxide and Solid Acid Catalyst", Journal of Industrial and Engineering Chemistry, The Korean Society of Industrial and Engineering Chemistry, Korea, 2001, 7(6); 424-429.
Kirk-Othmer , "Supercritical Fluids", Encyclopedia of Chemical Technology 3rd ed., John Wiley & Sons, New York.

(56) References Cited

OTHER PUBLICATIONS

Knopf et al., "Reactive Extraction of Lignin from Biomass Using Supercritical Ammonia-Water Mixtures", J. Supercritical Fluids, 1993, 6: 249-254.

Kupianen et al., "Comparison of formic and sulfuric acids as a glucose decomposition catalyst", Ind. Eng. Chem. Res., 49(18), 2010, 8444-8449 (Abstract).

Lee et al., "Hydrolysis of cellulose under subcritical and supercritical water using continuous flow system", Hwahak Konghak, 39(2), 2001, 257-263 (Abstract).

Levai, "Atom spectrometric methods for determination of trace metal impurities in pharmaceutical substances", Acta Pharmaceutica Hungarica, 71(3), 2001, 350-356 (Abstract).

Li et al., "Interaction of Supercritical Fluids with Lignocellulosic Materials", Industrial and Engineering Chemistry Research, 1988, 27(7): 1301-1312.

Li, "Analysis of failure cause in CCI pressure reducing valves used in product pipeline", Guandao Jishu Yu Shebei, (5), 2008, 34-36 (Abstract).

Li et al., "Studies of Monosaccharide Production through Lignocellulosic Waste Hydrolysis Using Double Acids", Energy & Fuels, 22(3), 2008, 2015-2021 (Abstract).

Li et al., "Improvement on technology of extracting xylose from the corncobs by acid method", Shipin Gongye Keji, 30(6), 2009, 263-264 (Abstract).

Li et al., "Fructose decomposition kinetics in organic acids-enriched high temperature liquid water", Biomass and Bioenergy, vol. 33, Issue 9, Sep. 2009, 1182-1187.

Lloyd et al., "Combined sugar yields for dilute sulfuric acid pretreatment of corn stover followed by enzymatic hydrolysis of the remaining solids", Bioresource Technology, 96(18), 2005, 1967-1977 (Abstract).

Lopez et al., "Chemical characterization and dilute-acid hydrolysis of rice hulls from an artisan mill", BioResources, 5(4), 2010, 2268-2277 (Abstract).

Lu et al., "Decomposition of Cellulose to Produce 5-hydroxymethyl-furaldehyde in Subcritical Water", Abstract of Transactions of Tranjin University, STN Accession No. 2008:1016799, Document No. 151:427986, 2008, 14(3), 198-201.

Lu et al., "Optimization of H2SO4-catalyzed hydrothermal pretreatment of rapeseed straw for bioconversion to ethanol: focusing on pretreatment at high solids content", Bioresource Technology 100(12), 2009, 3048-3053 (Abstract).

Luterbacher et al., "High-Solids Biphasic CO2-H2O Pretreatment of Lignocellulosic Biomass", Biotechnology and Bioengineering, 107(3), 2010, 451-460 (Abstract).

Malaluan et al., "Biomass conversion in supercritical water", Off. Proc. Comb. Conf., 6th Conf. Asia Pac. Confed. Chem. Eng., 21st Australas. Chem. Eng. Conf., vol. 1 (Publisher: Inst. Eng., Aus., Barton, Australia), 1993, 209/1-214/1 (Abstract).

Marchessault et al., "A New Understanding of the Carbohydrate System", Future Sources of Organic Raw Materials, 1980, 613-625.

Matsumura et al., "Supercritical Water Treatment of Biomass for Energy and Material Recovery", Combust. Sci. and Tech., 2006, 178:509-536.

Matsunaga et al., "Super-rapid chemical conversion of sugi wood by supercritical and subcritical water treatment", Mokuzai Gakkaishi, 50(5), 2004, 325-332 (Abstract).

McCoy et al., "Extraction of Lignin from Biomass with Supercritical Alcohol", J. Supercritical Fluids, 1989, 2:80-84.

McHugh et al., "Supercritical Fluid Extraction : Principles and Practice", Butterworths, 1986, pp. 293-310.

McWilliams et al., "Comparison of aspen wood hydrolysates produced by pretreatment with liquid hot water and carbonic acid", Applied Biochemistry and Biotechnology, 98-100, 2002, 109-121 (Abstract).

Miller-Ihli et al., "Direct determination of lead in sugars using graphite furnace atomic absorption spectrometry", Atomic Spectroscopy, 14(4), 1993, 85-9.

Miyazawa et al., "Polysaccharide Hydrolysis Accelerated by Adding Carbon Dioxide under Hydrothermal Conditions", Biotechnol. Prog., 2005, 21: 1782-1785.

Modell et al., "Supercritical Water Oxidation of Pulp Mill Sludges", TAPPI J., 1992, 75:195.

Mok et al., "Dilute acid hydrolysis of biopolymers in a semi-batch flow reactor at supercritical pressure", Energy from Biomass and Wastes, 13, 1990, 1329-1347 (Abstract).

Moreschi et al., "Hydrolysis of Ginger Bagasse Starch in Subcritical Water and Carbon Dioxide", Journal of Agricultural and Food Chemistry, 2004, 52(6), 1753-1758.

Mosier et al., "Optimization of pH controlled liquid hot water pretreatment of corn stover", Bioresource Technology, 96(18), 2005, 1986-1992 (Abstract).

Mosier et al., "Characterization of Acid Catalytic Domains for Cellulose Hydrolysis and Glucose Degradation", Biotechnology and Bioengineering, vol. 79, No. 6, Sep. 20, 2002, 610-618.

Nakata et al., "Bioethanol from cellulose with supercritical water treatment followed by enzymatic hydrolysis", Applied Biochemistry and Biotechnology, 129-132, 2006, 476-485 (Abstract).

Napradean et al., "Studies regarding cadmium determination by atomic absorption spectrometry. Note II. Pharmaceutical finished products", Farmacia, 53(2), 2005, 86-90 (Abstract).

Neureiter et al., "Dilute acid hydrolysis of presscakes from silage and grass to recover hemicellulose-derived sugars", Bioresource Technology, 92(1), 2004, 21-29 (Abstract).

Neureiter et al., "(Abstract) Dilute-acid hydrolysis of sugarcane bagasse at varying conditions", Applied Biochemistry and Biotechnology, 98-100, 2002, 49-58 (Abstract).

Ogihara et al., "Direct observation of cellulose dissolution in subcritical and supercritical water over a wide range of water densities (500-1000 kg/m3)", Cellulose, 2005, 12:595-606.

Osada et al., "Low Temperature Catalytic Gasification of Lignin and Cellulose with a Ruthenium Catalyst in Supercritical Water", Energy Fuels, 2004, 18: 327-333.

Parajo et al., "Pre-hydrolysis of Eucalyptus wood with dilute sulfuric acid: operation in autoclave", Holz als Roh- und Werkstoff, 52(2), 1994, 102-8 (Abstract).

Park et al., "Kinetics of cellulose decomposition under subcritical and supercritical water in continuous flow system", Korean Journal of Chemical Engineering, 19(6), 2002, 960-966 (Abstract).

Pasquini et al., "Sugar cane bagasse pulping using supercritical CO2 associated with co-solvent 1-butanol/water", J. of Supercritical Fluids, vol. 34, 2005, 125-134.

Pasquini et al., "Extraction of lignin from sugar cane bagasse and *Pinus taeda* wood chips using ethanol-water mixtures and carbon dioxide at high pressures", Journal of Supercritical Fluids, PRA Press, US, Nov. 2005, 36(1); 31-39.

Persson et al., "Supercritical Fluid Extraction of a Lignocellulosic Hydrolysate of Spruce for Detoxification and to Facilitate Analysis of Inhibitors", Biotechnology and Bioengineering, Wiley & Sons, Hoboken, NJ, US, Sep. 20, 2002, 79(6): 694-700.

Pessoa, Jr. et al., "Acid hydrolysis of hemicellulose from sugarcane bagasse", Brazilian Journal of Chemical Engineering, 14(3), 1997, 291-297 (Abstract).

Peter et al., "High Pressure Extraction of Lignin from Biomass", Supercritical Fluid Technology, 1985, p. 385.

Pohl et al., "Direct determination of the total concentrations of magnesium, calcium, manganese, and iron in addition to their chemical and physical fractions in dark honeys", Analytical Letters, 44(13), 2011, 2265-2279.

Ramirez et al., "Mathematical modelling of feed pretreatment for bioethanol production", Computer-Aided Chemical Engineering, vol. 26, 2009, 1299-1304 (Abstract).

Rao et al., "Pyrolysis Rates of Biomass Materials", Energy, 1998, 23:973-978.

Roberto et al., "Dilute-acid hydrolysis for optimization of xylose recovery from rice straw in a semi-pilot reactor", Industrial Crops and Products, 17(3), 2003, 171-176 (Abstract).

Saito et al., "The Investigation of Degradation Reaction of Various Saccharides in High Temperature and High Pressure Water", Journal of Physics:Cinference Series, 2008, 121.

(56) References Cited

OTHER PUBLICATIONS

Saka et al., "Chemical conversion of biomass resources to useful chemicals and fuels by supercritical water treatment", Bridgewater AV(ed) Progress in Thermocritical Biomass Conversion. Blackwell, Oxford, 2001, 1338-1348.
Saka, "Supercritical fluids to biomass research", Cellulose Communications, 5(3), 1998, 129-135 (Abstract).
Saka et al., "Supercritical fluids to biomass research (II)", Cellulose Communications, 9(3), 2002, 137-143 (Abstract).
Saka et al., "Chemical conversion of various celluloses to glucose and its derivatives in supercritical water", Cellulose Communications, 6(3), 1999, 177-191.
Sako, "Kinetic study of furfural formation accompanying supercritical carbon dioxide extraction", Journal of Chemical Engineering of Japan, Society of Chemical Engineers, Aug. 1, 1992, 25(4):372-377.
Sanchez et al., "Dilute-acid hydrolysis for fermentation of the Bolivian straw material Paja Brava", Bioresource Technology, 93(3), 2004, 249-256 (Abstract).
Sangarunlert et al., "Furfural production by acid hydrolysis and supercritical carbon dioxide extraction from rice husk", Korean Journal of Chemical Engineering, 2007, 24(6): 936-941.
Sarrouh et al., "Biotechnological production of xylitol: enhancement of monosaccharide production by post-hydrolysis of dilute acid sugarcane hydrolysate", Applied Biochemistry and Biotechnology, 153(1-3), 2009, 163-170 (Abstract).
Sasaki et al., "Cellulose Hydrolysis in Sub-Critical and Supercritical Water", Journal of Supercritical Fluids, 1998, 13:261-268.
Sasaki et al., "Direct hydrolysis of cellulose to glucose using ultra-high temperature and pressure steam explosion", Carbohydrate Polymers 89, 2012, 298-301.
Sasaki et al., "Rapid and selective conversion of cellulose to valuable chemical intermediates using supercritical water", Proc. 6th international Symposium on Supercritical Fluids, Tome 2, 2003, 1417-1422.
Sasaki et al., "Super-rapid enzymatic hydrolysis of cellulose with supercritical water solubilization pretreatment", Kobunshi Ronbunshu, 58(10), 2001, 527-532 (Abstract).
Sasaki et al., "Dissolution and Hydrolysis of Cellulose in Subcritical and Supercritical Water", Industrial & Engineering Chemistry Research, 39(8), 2000, 2883-2890.
Sasaki et al., "Kinetics of cellulose conversion at 25 MPa in sub-and supercritical water", AIChE Journal, 50(1), 2004, 192-202.
Saucedo-Luna et al., "Optimization of acid hydrolysis of bagasse from *Agave tequilana* Weber", Revista Mexicana de Ingenieria Quimica, 9(1), 2010, 91-97 (Abstract).
Schacht et al., "From plant materials to ethanol by means of supercritical fluid technology", J. of Supercritical Fluids, vol. 46, 2008, 299-321.
Sera et al., "Development of saccharification techniques for cellulosic biomass", Hitz Giho, 68(2), 2008, 40-45 (Abstract).
Sina et al., "Key Compounds of the Hydropyrolysis of Glucose in Supercritical Water in the Presence of K2CO3", Ind. Eng. Chem. Res., 2003, 42(15), 3516-3521.
Soederstroem et al., "Effect of Washing on Yield in One- and Two-Step Steam Pretreatment of Softwood for Production of Ethanol", Biotechnology Progress, 20(3), 2004, 744-749 (Abstract).
Spigno et al., "Cellulose and hemicelluloses recovery from grape stalks", Bioresource Technology, 99(10), 2008, 4329-4337 (Abstract).
Springer, "Prehydrolysis of hardwoods with dilute sulfuric acid", Industrial & Engineering Chemistry Product Research and Development, 24(4), 1985, 614-23 (Abstract).
Srinivasan et al., "Pretreatment of Guayule Biomass Using Supercritical Carbon Dioxide-Based Method", Bioresource Technology, 101(24), 2010, 9785-9791.
Srokol et al., "Hydrothermal upgrading of biomass to biofuel; studies on some monosacchride model compounds", Carbohydrate Research, 339(10), 2004, 1717-1726 (Abstract).
Steinke, "Valve solutions for high-pressure letdown", Proceedings of the Symposium on Instrumentation for the Process Industries, 44th, 1989, 39-43 (Abstract).

Steinke et al., "Valve solutions for high pressure letdown", Advances in Instrumentation, 42(3), 1987, 1381-1390 (Abstract).
Strobel et al., "Carbohydrate Transport by the Anaerobic Thermophile *Clostridium thermocellum* LQRI", Applied and Environmental Microbiology, Nov. 1995, 4012-4015.
Suitor et al., "Development of a coal slurry letdown valve", American Society of Mechanical Engineers, Fluids Engineering Division, vol. 23, 1985, 142-144 (Abstract).
Terol et al., "High-temperature liquid chromatography inductively coupled plasma atomic emission spectrometry hyphenation for the combined organic and inorganic analysis of foodstuffs", Journal of Chromatography, 1217(40), 2010, 6195-6202.
Trickett et al., "Dilute acid hydrolysis of bagasse hemicellulose", ChemSA, 8(3), 1982, 11-15 (Abstract).
Um et al., "Acid Hydrolysis of Hemicellulose in Green Liquor Pre-Pulping Extract of Mixed Northern Hardwoods", Appl. Biochem Biotechnol, 153(1-3), 2009, 127-38.
Van Walsum et al., "Carbonic acid enhancement of hydrolysis in aqueous pretreatment of corn stover", Bioresource Technology, 93(3), 2004, 217-226 (Abstract).
Van Walsum, "Severity function describing the hydrolysis of xylan using carbonic acid", Applied Biochemistry and Biotechnology, 91-93, 2001, 317-329 (Abstract).
Varga et al., "Optimization of steam pretreatment of corn stover to enhance enzymatic digestibility", Applied Biochemistry and Biotechnology, 113-116, 2004, 509-523 (Abstract).
Veres et al., "Studies on matrix effects in the determination of the metal content of sugar complexes by atomic absorption spectrometry", Magyar Kemiai Folyoirat, 93(5), 1987, 199-204 (Abstract).
Vick Roy et al., "Biomass hydrolysis with sulfur dioxide and water in the region of the critical point", Process Technology Proceedings, 3 Supercrit. Fluid Technol., 1985, 397-444 (Abstract).
Wiboonsiriku et al., "Properties of Extracts from Defatted Rice Bran by its Subcritical Water Treatment", Journal of Agricultural and Food Chemistry, 2007, 55(21), 8759-8765.
Wu et al., "Determination of trace calcium in glucose by Zeeman flame atomic absorption spectrometry", Guangdong Weiliang Yuansu Kexue, 14(3), 2007, 58-60 (Abstract).
Yang et al., "Steaming extraction of corncob xylan for production of xylooligosaccharide", Wuxi Qinggong Daxue Xuebao, 17(4), 1998, 50-53 (Abstract).
Yee et al., "Improvement of xylose production by acid hydrolysis of bagasse pith with low liquor ratio", Taiwan Tangye Yanjiuso Yanjiu Huibao, 98, 1982, 59-70 (Abstract).
Yoshida et al., "Gasification of Biomass Model Compound and Real Biomass in Supercritical Water", Biomass and Bioenergy, 2004, 26:71-78.
Yu et al., "Characteristics and Precipitation of Glucose Oligomers in the Fresh Liquid Products Obtained from the Hydrolysis of Cellulose in", Hot-Compressed Water, Industrial & Engineering Chemistry Research, 48(23), 2009. 10682-10690 (Abstract).
Zhang et al., "Cellulose utilization by *Clostridium thermocellum*: Bioenergetics and hydrolysis product assimilation", PNAS, May 17, 2005, 7321-7325.
Zhang et al., "Lignocellulosic ethanol residue-based lignin-phenol-formaldehyde resin adhesive", International Journal of Adhesion & Adhesives, vol. 40, 2013, 11-18.
Zhang et al., "Preparation and properties of lignin-phenol-formaldehyde resins based on different biorefinery residues of agricultural biomass", Industrial Crops and Products, vol. 43, 2013, 326-333.
Zhao et al., "Supercritical hydrolysis of cellulose for oligosaccharide production in combined technology", Chemical Engineering Journal, Aug. 1, 2009, 150(2):411-417.
Zhao et al., "Fermentable hexose production from corn stalks and wheat straw with combined supercritical and subcritical huydrothermal technology", Bioresource Technology, 100(23), 2009, 5884-5889 (Abstract).
Zhao et al., "Supercritical pretreatment and hydrolysis of cellulose", Huaxue Xuebao, 66(20), 2008, 2295-2301 (Abstract).
Zhao et al., "Combined supercritical and subcritical process for cellulose hydrolysis to fermentable hexoses", Environmental Science & Technology, 43(5), 2009, 1565-1570.

(56) References Cited

OTHER PUBLICATIONS

Zhuang et al., "Research on biomass hydrolysis under extremely low acids by HPLC", Taiyangneng Xuebao, 28(11), 2007, 1239-1243 (Abstract).

U.S. Appl. No. 13/479,852, Issue Notification, mailed Mar. 6, 2013, 1 page.

U.S. Appl. No. 13/479,852, Notice of Allowance, mailed Feb. 26, 2013, 2 pages.

U.S. Appl. No. 13/479,852, Notice of Allowance, mailed Dec. 5, 2012, 9 pages.

U.S. Appl. No. 13/437,264, Notice of Allowance, mailed Nov. 23, 2012, 30 pages.

U.S. Appl. No. 13/464,453, Issue Notification, mailed Nov. 7, 2012, 1 page.

U.S. Appl. No. 13/464,453, Notice of Allowance, mailed Oct. 9, 2012, 9 pages.

U.S. Appl. No. 13/464,275, Notice of Allowance, mailed Dec. 3, 2013, 4 pages.

International Patent Application No. PCT/US2012/036566, International Preliminary Report on Patentability, issued Nov. 5, 2013, 4 pages.

International Patent Application No. PCT/US2012/036591, International Preliminary Report on Patentability, issued Nov. 5, 2013, 7 pages.

\* cited by examiner

LIGNIN PRODUCTION FROM LIGNOCELLULOSIC BIOMASS

CROSS REFERENCE TO RELATED APPLICATIONS

This application claims priority to U.S. application Ser. No. 13/464,275 filed May 4, 2012, currently pending, which claims the benefit of U.S. 61/482,479 filed May 4, 2011, the entire disclosures of which are incorporated by reference.

FIELD OF THE INVENTION

The present invention generally relates to methods of preparing lignin from lignocellulosic biomass. More particularly, it relates to methods of preparing lignin from lignocellulosic biomass using rapid full or partial pressure reduction to separate and to pulverize the lignin without fouling the equipment and with improved energy recovery.

BACKGROUND OF THE INVENTION

Existing processes delignify lignocellulosic biomass before entering the cellulose conversion process using solvents or other chemicals. In such delignification processes, complex equipment is typically required and is expensive to operate because of the solvent or chemical usage and lack of recovery methods. In other existing processes, the solid conversion of lignocellulosic biomass in pre-treatment and hydrolysis requires high temperatures to fully or partially solubilize the lignin present. Upon cooling, the lignin precipitates from solution. The lignin may be recovered from the process and burned for thermal energy. The particle size of the recovered lignin may be variable and too large for efficient burning, thus requiring a separate pulverizing step. Furthermore, as the lignin in solution cools, it becomes sticky (typically in the glass transition temperature range of lignin, which is about 100° C. under ambient pressure) and tends to foul the process equipment to the point of making the process inoperable. It would be useful to have methods for providing lignin of a substantially uniform, small particle size for improving burning efficiency, for enhanced properties for the use of lignin as a feedstock for the production of other chemicals, and for avoiding typical equipment fouling problems. It would also be useful to maximize energy recovery. The methods and compositions of the present invention are directed toward these, as well as other, important ends.

SUMMARY OF THE INVENTION

In one embodiment, the invention is directed to methods of preparing lignin from lignocellulosic biomass, comprising:
providing lignocellulosic biomass at a first pressure and at a first temperature, said lignocellulosic biomass comprising:
  a first solid fraction comprising:
    insoluble lignin; and
  a first liquid fraction comprising:
    soluble $C_6$ saccharides; and
    soluble lignin;
reducing said first temperature of said lignocellulosic biomass to a second temperature at least about 1° C. above the glass transition temperature of lignin under said first pressure; and
reducing said first pressure of said lignocellulosic biomass at said second temperature to a second pressure in a time less than about 1 second to precipitate said soluble lignin in said first liquid fraction and form a mixture comprising:
  a second solid fraction comprising:
    insoluble lignin; and
    precipitated lignin; and
  a second liquid fraction comprising:
    soluble $C_6$ saccharides;
wherein the average particle size of said insoluble lignin and precipitated lignin is less than about 500 microns.

In another embodiment, the invention is directed to lignin products produced by the methods of the invention.

In another embodiment, the invention is directed to compositions, comprising:
lignin having an average size of no greater than about 500 micron;
wherein said lignin is processed from lignocellulosic biomass using supercritical or near critical fluid extraction.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
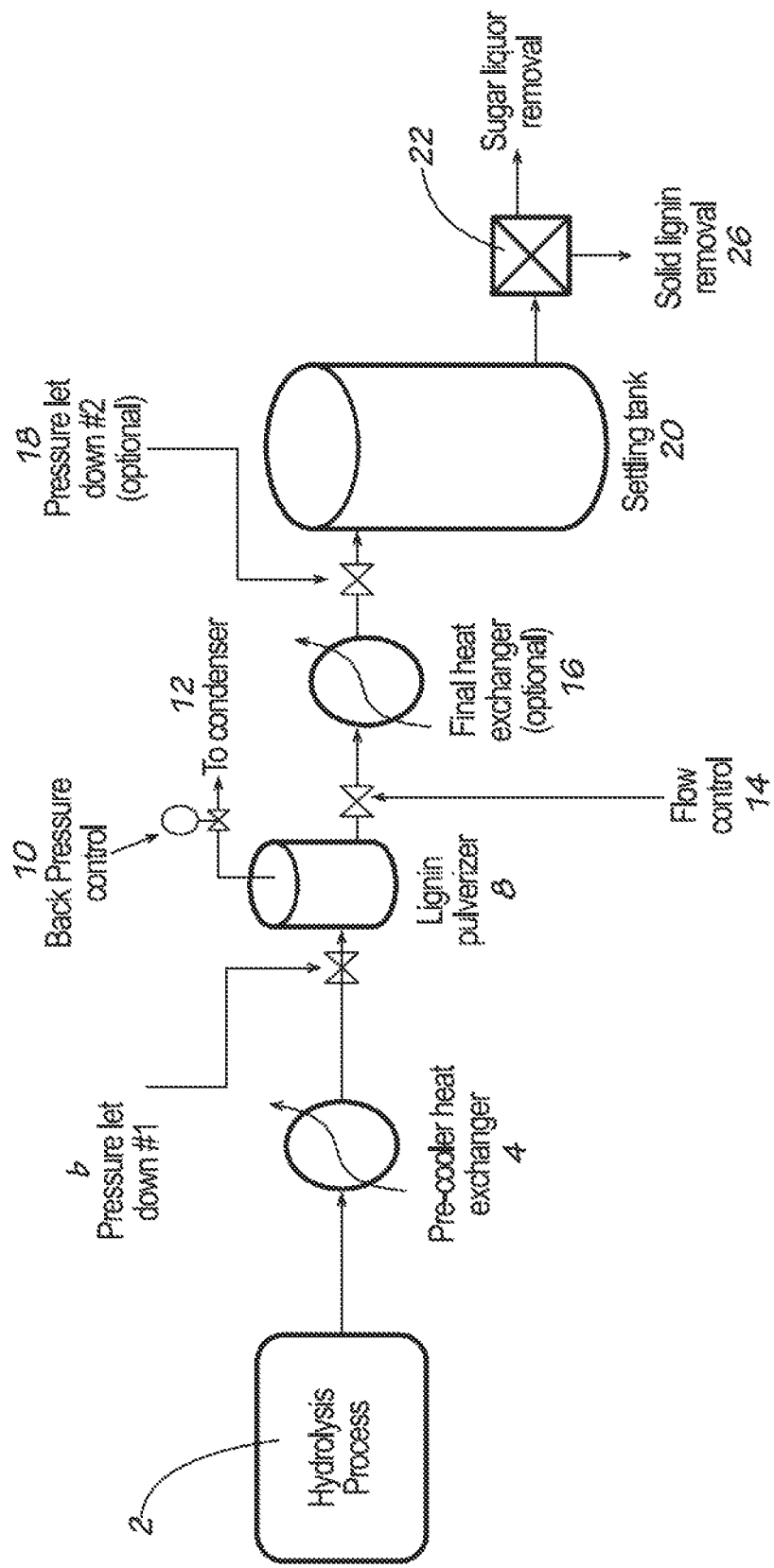
FIG. 1 is a schematic diagram of the method of producing lignin from cellulosic biomass in one embodiment of the invention.

As employed above and throughout the disclosure, the following terms, unless otherwise indicated, shall be understood to have the following meanings As used herein, the singular forms "a," "an," and "the" include the plural reference unless the context clearly indicates otherwise.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading may be combined with embodiments illustrated under any other heading.

The use of numerical values in the various quantitative values specified in this application, unless expressly indicated otherwise, are stated as approximations as though the minimum and maximum values within the stated ranges were both preceded by the word "about." In this manner, slight variations from a stated value can be used to achieve substantially the same results as the stated value. Also, the disclosure of ranges is intended as a continuous range including every value between the minimum and maximum values recited as well as any ranges that can be formed by such values. Also disclosed herein are any and all ratios (and ranges of any such ratios) that can be formed by dividing a recited numeric value into any other recited numeric value. Accordingly, the skilled person will appreciate that many such ratios, ranges, and ranges of ratios can be unambiguously derived from the numerical values presented herein and in all instances such ratios, ranges, and ranges of ratios represent various embodiments of the present invention.

As used herein, the phrase "substantially free" means have no more than about 1%, preferably less than about 0.5%, more preferably, less than about 0.1%, by weight of a component, based on the total weight of any composition containing the component.

As used herein, the term "saccharification" and "saccharified" refers to the breakdown of polysaccharides to smaller polysaccharides, including oligosaccharides, and monosaccharides, whether through hydrolysis, the use of enzymes, or other means, generally into a liquid fraction and a solid fraction.

A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near-critical water has a temperature at or above about 300° C. and below the critical temperature of water (374.2° C.), and a pressure high enough to ensure that all fluid is in the liquid phase. Sub-critical water has a temperature of less than about 300° C. and a pressure high enough to ensure that all fluid is in the liquid phase. Sub-critical water temperature may be greater than about 250° C. and less than about 300° C., and in many instances sub-critical water has a temperature between about 250° C. and about 280° C. The term "hot compressed water" is used interchangeably herein for water that is at or above its critical state, or defined herein as near-critical or sub-critical, or any other temperature above about 50° C. (preferably, at least about 100° C.) but less than subcritical and at pressures such that water is in a liquid state.

As used herein, a fluid which is "supercritical" (e.g. supercritical water, supercritical $CO_2$, etc.) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g. water and ethanol, water and $CO_2$, etc.). Thus, for example, "a mixture of sub-critical water and supercritical carbon dioxide" indicates a mixture of water and carbon dioxide at a temperature and pressure above that of the critical point for carbon dioxide but below the critical point for water, regardless of whether the supercritical phase contains water and regardless of whether the water phase contains any carbon dioxide. For example, a mixture of sub-critical water and supercritical $CO_2$ may have a temperature of about 250° C. to about 280° C. and a pressure of at least about 225 bar.

As used herein, "continuous" indicates a process which is uninterrupted for its duration, or interrupted, paused or suspended only momentarily relative to the duration of the process. Treatment of biomass is "continuous" when biomass is fed into the apparatus without interruption or without a substantial interruption, or processing of said biomass is not done in a batch process.

As used herein, "resides" indicates the length of time which a given portion or bolus of material is within a reaction zone or reactor vessel. The "residence time," as used herein, including the examples and data, are reported at ambient conditions and are not necessarily actual time elapsed.

As used herein, the term "substantial free of" refers to a composition having less than about 1% by weight, preferably less than about 0.5% by weight, and more preferably less than about 0.1% by weight, based on the total weight of the composition, of the stated material.

As used herein, the term "glass transition temperature" or "Tg" means the temperature at which an amorphous material changes from a brittle, vitreous state to a plastic state. It is dependent upon the composition of the material being tested, including moisture content, the extent of annealing, and the pressure exerted on the material. Glass transition temperature may be measured by differential scanning calorimetry, thermomechanical analysis, dynamic mechanical analysis, and the like.

As used herein, "pulverize" means providing a small particle size, such as through spraying or atomizing, or reducing the particle size of a given material, whether or not through the use of mechanical means.

As used herein, "lignocellulosic biomass or a component part thereof" refers to plant biomass containing cellulose, hemicellulose, and lignin from a variety of sources, including, without limitation (1) agricultural residues (including corn stover and sugarcane bagasse), (2) dedicated energy crops, (3) wood residues (including sawmill and paper mill discards), and (4) municipal waste, and their constituent parts including without limitation, lignocellulose biomass itself, lignin, $C_6$ saccharides (including cellulose, cellobiose, $C_6$ oligosaccharides, $C_6$ monosaccharides, and $C_5$ saccharides (including hemicellulose, $C_5$ oligosaccharides, and $C_5$ monosaccharides).

Generally, the methods of the invention precipitate out and pulverize (provide as a small particle size or reduce the particle size) lignin and avoid fouling of the process equipment while maximizing heat recovery. This is accomplished by cooling the stream containing the lignin to just above its glass transition temperature (Tg) to prevent sticking and then rapidly dropping the pressure so that the lignin is well below its Tg at the new pressure when it precipitates out of solution at a small particle size.

Accordingly, in one embodiment, the invention is directed to methods of preparing lignin from lignocellulosic biomass, comprising:
  providing a lignocellulosic biomass at a first pressure and at a first temperature, said lignocellulosic biomass comprising:
    a first solid fraction comprising:
      insoluble lignin; and
    a first liquid fraction comprising:
      soluble $C_6$ saccharides; and
      soluble lignin;
  reducing said first temperature of said lignocellulosic biomass to a second temperature at least about 1° C. above the glass transition temperature of lignin under said first pressure; and
  reducing said first pressure of said lignocellulosic biomass at said second temperature to a second pressure in a time less than about 1 second to precipitate said soluble lignin in said first liquid fraction and form a mixture comprising:

a second solid fraction comprising:
   insoluble lignin; and
   precipitated lignin; and
a second liquid fraction comprising:
   soluble $C_6$ saccharides;
wherein the average particle size of said insoluble lignin and precipitated lignin is less than about 500 microns.

A schematic of one embodiment of the invention is shown in FIG. 1. The lignin slurry exits the hydrolysis process 2. It is cooled to just above its glass transition temperature to maximize heat recovery, for example, in a pre-cooler heat exchanger 4. The lignin slurry is then subjected to a rapid pressure drop, for example, through the pressure letdown valve 6, and subsequently the liquid (i.e., water) content in the slurry is flash evaporated. This results in the sudden precipitation of the soluble lignin into fine particles inside the lignin pulverizer 8. In certain embodiments, the pulverizer is of relatively small volume to keep the slurry moving and avoid lignin settling. In other embodiments, it may be of a large volume to permit settling of the lignin, which may be recovered by mechanical means, especially when using full flash. The inlet pipe to the pulverizer may either be above, below, or to either side of the pulverizer. Atmospheric pressure for full pressure reduction, or an intermediate pressure in the case of a partial pressure reduction, is maintained in the pulverizer by the back pressure control valve 10. In embodiments using full flash to atmospheric pressure, no back pressure control is needed. Any recovered steam enters a condenser 12 (not shown) for heat recovery. Following the pulverizer, the slurry flows through flow control 14 and then is further cooled to recover more heat in a heat exchanger 16, and is reduced to atmospheric pressure, if not yet at atmospheric temperature, via a pressure letdown valve 18 in the settling tank 20. In the tank, the lignin is permitted to settle to the bottom. Finally, the slurry may be passed through a solid/liquid filtration apparatus 22 for final separation of liquor 24 and lignin 26.

Advantages of the methods of the invention are that the pulverization (preparation of small particles and/or reduction in average particle size) of soluble and insoluble lignin improves handling, accelerates the drying, and improves combustion of the lignin. Another advantage of the methods of the invention is that the glass transition phase of the lignin, both soluble and insoluble, is avoided, to avoid fouling of the process equipment and permit pulverization of the lignin.

In certain embodiments of the method, lignocellulosic biomass is fractionated to remove at least a portion of $C_5$ saccharides by any suitable means, including, but not limited to, hydrothermal treatment (such as hot compressed water, subcritical, near critical, or supercritical water, which may contain other fluids, including alcohol, acid, or base), enzymatic treatment, and the like.

In certain embodiments of the method, the average particle size of said insoluble lignin and precipitated lignin is less than about 500 microns.

The methods of the invention are preferably run continuously, although they may be run as batch or semi-batch processes.

The methods of the invention may be carried out in any suitable reactor, including, but not limited to, a tubular reactor, a digester (vertical, horizontal, or inclined), and the like. Suitable digesters include the digester system described in U.S. Pat. No. 8,057,639, which include a digester and a steam explosion unit, the entire disclosure of which is incorporated by reference.

In certain embodiments, the method further comprises the step of reducing the temperature of said mixture. All of the embodiments of the invention involve a temperature reduction from the temperature at which the saccharified lignocellulosic biomass is provided, typically about 280° C. to about 375° C. (hydrolysis temperature) to eventually ambient or near ambient temperatures, typically about 20° C. to about 60° C. The key of the temperature reduction is that the temperature is reduced instantaneously across the glass transition temperature range of the lignin to permit pulverization of the lignin.

In embodiments where there is a partial pressure reduction in the method, the second pressure is greater than atmospheric pressure.

In embodiments where there is a full pressure reduction in the method, the second pressure is about atmospheric pressure.

In certain embodiments, the method further comprises the step of reducing the pressure on said mixture to a third pressure. Pressure control impacts temperature in the flashing process where the saccharified lignocellulosic biomass is cooled in a very short period of time (e.g., less than one second). The inlet pressure must be equal to or greater than the saturation pressure at the given temperature so that the liquid components of fraction remain as liquids. With respect to processing of lignocellulosic biomass, it is preferably to avoid the temperature range of about 180° C. and about 240° C., the glass transition temperature range of lignin under typical processing conditions. Thus, if the inlet temperature is at least the 240° C.+1° C., then the minimum inlet pressure needs to be about 34 bar but may be much higher. For example, it is typical to have the inlet pressure at 40 bar. The exit temperature is determined and dependent upon the exit pressure. If, for example, there is flash cooling of the saccharified lignocellulosic biomass down to a temperature of 180° C., then the exit pressure needs to equal to the saturation pressure at 180° C., which about 10 bar. The exit pressure is controlled by the back pressure valve, and the exit temperature is determined by the exit pressure. If the exit pressure is changed, the exit temperature will also change. The exit temperature is the saturation temperature at the selected pressure.

In certain embodiments, the method further comprises the step of permitting said insoluble lignin and said precipitated lignin, where the lignin has been pulverized (provided as a small particle size or reduce the particle size) to separate out by gravity.

In certain embodiments, the method further comprises the step of separating said second solid fraction and said second liquid fraction. Suitable separation methods including filtration methods well known to those skilled in the art, such as decanter filters, filter press, reverse osmosis and nanofiltration, centrifuge decanters, and the like.

In certain embodiments, the method further comprises the step of recovering heat using at least one heat exchanger, for example, using a pre-cooler heat exchanger 4 or final heat exchanger 16.

In another embodiment, the invention is directed to lignin products produced by the methods of the invention, including fuels, such as those used in a process heat boiler. The lignin product may also be used as a functional replacement for phenol, as a functional replacement for polyol, or as a building block for carbon fiber. In other embodiments, the compositions of the invention comprising lignin may be utilized in a variety of applications, including, but not limited to, fuels, tackifiers, phenol formaldehyde resin extenders in the manufacture of particle board and plywood, in the manufacture of molding compounds, urethane and epoxy resins, antioxidants, controlled-release agents, flow control agents, cement/concrete mixing, plasterboard production, oil drilling, general dispersion, tanning leather, road covering, vanillin production, dimethyl sulfide and dimethyl sulfoxide production, phenol substitute in phenolic resins incorporation into polyolefin blends, aromatic (phenol) monomers, additional miscellaneous monomers, carbon fibers, metal sequestration in solutions, basis of gel formation, polyurethane copolymer—as a renewable filler/extender, and the like.

In another embodiment, the invention is directed to compositions, comprising:
lignin;
wherein said lignin is processed from lignocellulosic biomass using supercritical or near critical fluid extraction.

In preferred embodiments, the composition is substantially free of organic solvent. In preferred embodiments, the lignin product has an average particle size less than about 500 microns, more preferably, less than 300 microns, even more preferably, less than about 250 microns, and yet even more preferably less than about 50 microns. The particle size of the lignin may be measured by standard sieve shaker, microscopy, light scattering, laser diffraction, and other standard size analysis techniques.

In a preferred embodiment, the lignin has a heating value as measured by ASTM-D240 of at least about 5,000 BTU/lb at 30% moisture content. In a preferred embodiment, the lignin has a heating value as measured by ASTM-D240 of at least about 7,500 BTU/lb at 15% moisture content. In a preferred embodiment, the lignin has a heating value as measured by ASTM-D240 of at least about 8,000 BTU/lb at 5% moisture content.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

Example 1

Pretreatment (fractionation) and cellulose hydrolysis processes liberate lignin from lignocellulosic biomass utilized as feedstock. For testing in this example, lignin samples, which were generated from the flashing of cellulose effluent, were tested to determine heating value, proximate, ultimate, and ash fusion temperature, ash oxide composition, moisture content, and particle size.

Drying Rate and Moisture Content

When the lignin is separated from the flashed cellulose hydrolysis effluent glucose stream utilizing gravity and 20 µm filter paper, it has an average moisture content between 65% and 75%, by weight. This can be further reduced by using a centrifuge or vacuum filtration unit to more effectively separate the solids from the mother liquor. The representative lignin sample was obtained from the sludge collected in the bottom of the glucose product tank, whose product was generate from multiple runs of 100 mesh wood flour at the cellulose hydrolysis conditions of about 225 bar and 375° C. The sample was subsequently allowed to air dry to measure its drying rate.

Figure 2:
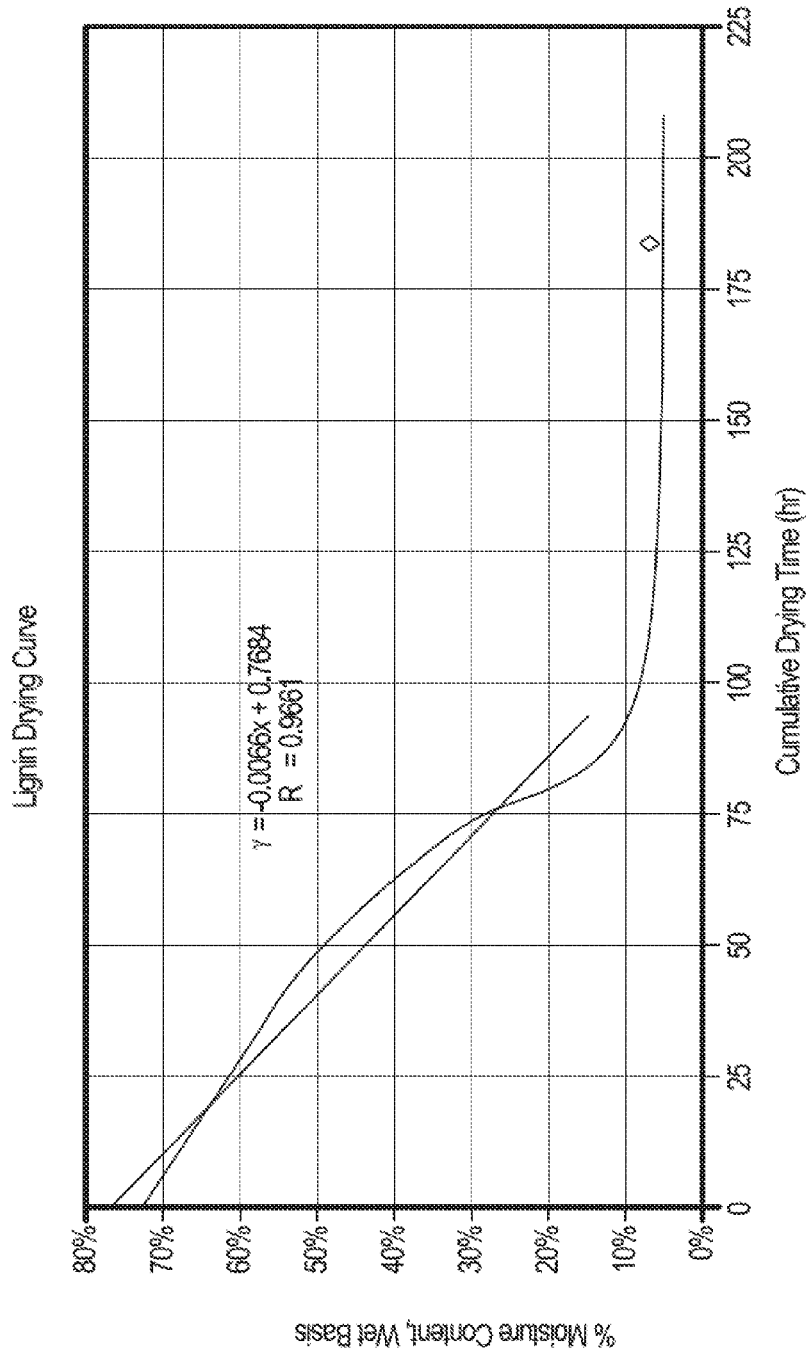
FIG. 2 is a plot of % moisture content (wet basis) as a function of cumulative drying time in hours for lignin.

The results are shown in FIG. 2. The curve indicates that the lignin dries to 10% moisture content, by weight, settling around 5%, by weight, after approximately 105 hours. This was drier than expected and may have been due to the location (inside plant) where the drying experiments were conducted. Ambient conditions were warmer and drier than would be anticipated if the lignin were dried outside where solar insulation, diurnal temperature changes, humidity, and precipitation would be expected to keep the final moisture content between 20% and 25%, by weight. The first 75 hours of drying follows a typical constant rate drying period with moisture moving to the particle surface sufficiently fast to maintain a saturated condition at the surface. This indicates that the rate of drying is controlled by the rate of heat transferred to the evaporating surface. The lower part of the curve, from 75 to 125 hours, is typical of a continuously changing drying rate (usually decreasing) indicating a change in the controlling mechanism for drying. The surface area of the particle can no longer remain fully saturated and evaporation begins shifting into the particle interior where the internal particle water diffusion rate begins to control the drying process.

Heating Value

The heating values of the lignin at various moisture contents were analyzed. The heating value of a fuel is the measure of the heat released during its complete combustion with oxygen. Any fuel will contain hydrogen, and water will be formed as a product of combustion when hydrogen is burned in air. This generated water may remain the vapor state or condense to liquid creating a substantial difference in the measured heat value due to the latent heat of vaporization associated with the phase change. When determining the heat given up by a unit of fuel, the higher (or gross) heating value (HHV) is usually reported where it is assumed than any water generated is all condensed, thus the heating value incorporates the latent heat of vaporization. For the lower (or net) heating value (LHV), none of the water is assumed to have condensed and all of the products of combustion remain is the gaseous state. The HHV may be determined using an oxygen bomb calorimeter and is expressed in terms of heat related per unit weight of fuel (Btu/$lb_f$). Determination of LHV may be calculated from the following equation:

$$HHV = LHV + nHvp$$

where:
HHV=fuel high heating value (Btu/$lb_f$)
LHV=fuel high heating value (Btu/$lb_f$)
n=stoichiometric mass of water generated per mass of fuel combusted ($lb_w$/$lb_f$)
Hvp=latent heat of vaporization of water (Btu/$lb_w$)

Figure 3:
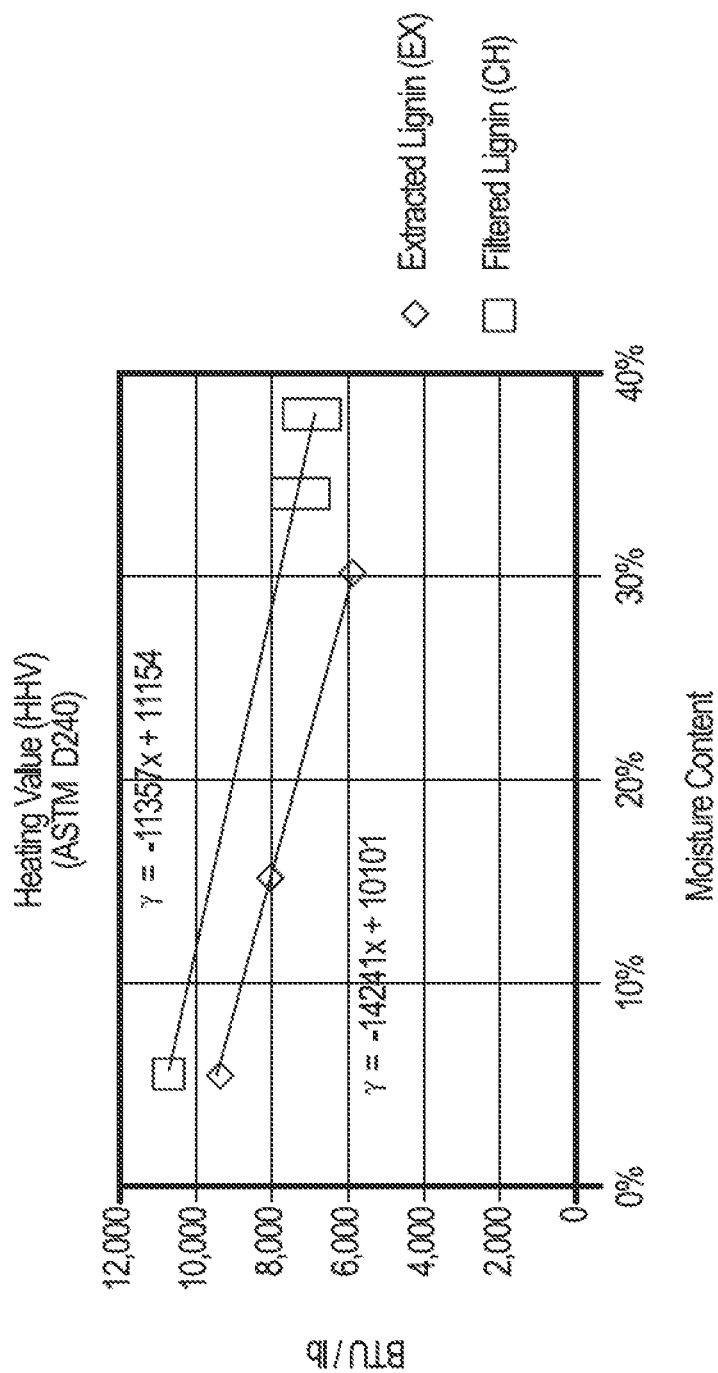
FIG. 3 is a plot of high heating value (HHV) as a function of moisture content for extracted lignin and filtered lignin.

The results of testing using an oxygen bomb calorimeter in accordance with ASTM Method D240 are shown in FIG. 3 for extracted lignin and filtered lignin. The heating value data decreases with increasing moisture content. The filtered lignin is the lignin obtained from flashing the cellulose hydrolysis effluent to atmospheric conditions. The extracted lignin was extracted from the fractionation slurry utilizing ethanol. The average heating value for the filtered lignin at 25% moisture content is approximately 8,200 Btu/lb.

Particle Size

Surface area/mass ratio for discrete particles is an important aspect of the lignin's usefulness as a fuel because it impacts combustion efficiency, boiler design, and method of introduction of combustion air. Improperly sized fuel may not burn completely and heat energy can be lost in the form of carbon rich bottom and/or fly ashes. Measuring particle size may be done by classification, e.g., sieving, or by observing under a microscope a representative sample and comparing to an appropriate scale. The average particle size was determined using a Magnaview DC5-153 microscope and a calibrated scaling slide. The average particle diameter observed was 10 μm to 30 μm at 37% moisture content for separated solids derived from cellulose hydrolysis, where the solids were determined to be approximately 80% lignin.

Proximate Analysis

Proximate analysis of a fuel describes the volatiles, fixed carbon, moisture content, and ash present in a fuel as a percentage of dry fuel weight. The percentages of volatiles and fixed carbon both have a direct impact on the heating value of the fuel, flame temperature, and combustion process in general. Other than carbon and metals, all other fuels burn as a gas. The percentage of volatiles represents the amount of fuel that would burn in the gas phase with the remaining carbon burning as a solid on the grates or as a fine particulate. The ash content is important in the design of air pollution control equipment, boiler grates, and bottom ash handling equipment.

The results for a single sample are shown in Table 1.

TABLE 1

| Sample No. | % Moisture Content | % Ash Content | % Volatile Matter | % Fixed Carbon |
|---|---|---|---|---|
| 1 | 18.57 | 0.44 | 56.75 | 24.24 |

Ultimate Analysis

Ultimate analysis of a fuel describes its elemental composition as a percentage of the fuel sample's dry weight. The main elements typically considered are carbon (C), hydrogen (H), nitrogen (N), sulfur (S), and oxygen (O), and while not an element, ash. Sulfur and ash percentages are particularly important because they are needed to accurately estimate air emission rates for sulfur dioxides ($SO_x$) and particulate matter (PM) for use in effective design of air pollution control equipment and air permitting.

The results for a single sample are shown in Table 2.

TABLE 2

| Sample No. | % C | % H | % N | % O (by difference) | % S | % Ash |
|---|---|---|---|---|---|---|
| 1 | 51.00 | 6.56 | 0.15 | 41.74 | 0.02 | 0.44 |

Ash Fusion Temperature

Ash fusion temperatures are determined by viewing a mounded specimen of the fuel's (lignin) ash through an observation window in a high-temperature furnace in both reducing and oxidizing atmospheres. The ash, in the form of a cone, pyramid, or cube, is heated steadily above 1000° C. to as high a temperature as possible, preferably 1600° C. (2910° F.). The following temperatures are then recorded:

Initial deformation temperature (IT): This is reached when the point of the mound first begins to deform and round.

Softening (spherical) temperature (ST): This is reached when the top of the mound takes on a spherical shape, i.e., the base of the cone is equal to its height.

Hemispherical temperature (HT): This is reached when the entire mound takes on a hemispherical shape, i.e., the base of the cone is twice its height.

Flow (fluid) temperature (FT): This is reached when the molten ash collapse to a flattened button on the furnace floor, i.e., spread to a fused mass.

Generally, a temperature under reducing should be equal to or lower than the corresponding temperature under oxidizing conditions. The difference in these temperatures generally increases with increasing iron content in the ash. Fusion temperatures should monotonically increase in order of IT, ST, HT, and FT.

The results for a single sample in an oxidizing atmosphere are shown in Table 3.

TABLE 3

| Initial deformation temperature (IT): | 2136° F. (1169° C.) |
|---|---|
| Softening (spherical) temperature (ST): | 2141° F. (1172° C.) |
| Hemispherical temperature (HT): | 2143° F. (1173° C.) |
| Flow (fluid) temperature (FT): | 2144° F. (1174° C.) |

A spherical temperature, a critical temperature for fuel evaluation, that is too low will cause slagging problems in the combustion chamber of a boiler. As the ash softens and melts, it subsequently impacts a surface within the combustion chamber where it cools and forms a glassy substance called clinker, which must be removed. Its removal severely impedes boiler operations as the boiler must be shutdown. If the melted ash cools on a heat transfer surface, the resultant layer builds up, fouling the heat exchanger decreasing its overall efficiency and thus the boiler efficiency as well. It is preferred to have an ST of 35° C. to 65° C. (100° F. to 150° F.) above the actual flue gas temperature peak at the combustion chamber exit to minimize the impact.

The ash fusion temperature gives an indication of its softening and melting behavior.

Ash Mineral Oxide Analysis

Ash mineral oxide composition is also useful in understanding how the ash generated by the combustion of lignin will behave in the combustion chambers of the biomass boiler. Composition does affect the ranges of fusion temperatures, particularly the iron levels and base to acid oxide rations. Typical analyses determine the weight percentage of the following mineral oxides silica ($SiO_2$), alumina ($Al_2O_3$), ferric oxide ($Fe_2O_3$), titanium dioxide ($TiO_2$), phosphorous pentoxide ($P_2O_5$), calcium oxide (CaO), magnesium oxide (MgO), manganese oxide (MnO), sodium oxide ($Na_2O$), potassium oxide ($K_2O$), and sulfur trioxide ($SO_3$). The silica, alumina, and titanium dioxide make up the group of acidic oxides with the remaining compounds forming the basic oxides.

The results for a single sample are shown in Table 4.

TABLE 4

| Sample No. | % Al as $Al_2O_3$ | % Ca as CaO | % Fe as $Fe_2O_3$ | % Mg as MgO | % Mn as MnO | % P as $P_2O_5$ | % K as $K_2O$ | % Si as $SiO_2$ | % Na as $Na_2O$ | % Ti as $TiO_2$ | % S as $SO_3$ | % Sum |
|---|---|---|---|---|---|---|---|---|---|---|---|---|
| 1 | 7.52 | 18.56 | 22.30 | 1.57 | 0.19 | 1.05 | 1.20 | 29.18 | 1.19 | 3.67 | 13.15 | 99.56 |

Table 5 shows a side-by-side comparison for a typical high-rank eastern Kentucky coal, a typical hardwood, and the cellulose hydrolysis-derived lignin.

TABLE 5

| Characteristic | Eastern Kentucky Coal | Typical Hardwood | Cellulose Hydrolysis-derived Lignin |
|---|---|---|---|
| Heating value (Btu/lb) | 13254 @ 5% MC | 8839 (oven dried) | 8200 @ 25% MC |
| Proximate Analysis | | | |
| % Moisture content | 1.2 | 45.6 | 18.57 |
| % Ash | 10.15 | 0.45 | 0.44 |
| % Volatile matter | 36.82 | 48.58 | 56.75 |
| % Fixed carbon | 53.03 | 5.52 | 24.24 |
| Ultimate Analysis | | | |
| % C | 75.0 | 51.64 | 51.09 |
| % H | 7/0 | 6.26 | 6.56 |
| % N | 1.0 | 0 | 0.15 |
| % S | 3.0 | 0.009 | 0.02 |
| % O (by difference) | 6.2 | 41.45 | 41.74 |
| % Ash | 7.8 | 0.65 | 0.44 |
| Ash fusion temperatures (oxidizing) | | | |
| IT (° F.) | 1627 | | 2136 |
| ST (° F.) | 1647 | 1652 | 2141 |
| HT (° F.) | 1649 | | 2143 |
| FT(° F.) | 1649 | | 2144 |
| Ash mineral oxide analysis | | | |
| % Al as $Al_2O_3$ | 30.67 | 0.03 | 7.52 |
| % Ca as CaO | 1.16 | 31.35 | 18.56 |
| % Fe as $Fe_2O_3$ | 4.87 | 0.09 | 22.30 |
| % Mg as MgO | 0.42 | 7.57 | 1.57 |
| % P as $P_2O_5$ | 0.13 | 0.56 | 1.09 |
| % K as $K_2O$ | 0.99 | 10.25 | 1.20 |
| % Si as $SiO_2$ | 58.20 | 0.13 | 29.18 |
| % Na as $Na_2O$ | 0.17 | 0.06 | 1.18 |
| % Ti as $TiO_2$ | 2.08 | — | 3.67 |
| % S as $SO_3$ | 1.29 | 1.21 | 13.15 |

As can be seen, the lignin's HHV is better than typical hardwood (allowing for moisture content), but not quite as high as coal. However, the lignin is considered to be a relatively high energy density fuel. With better than 55% of the lignin representing volatile matter and less than 0.50% ash, most of the lignin is expected to combust and exit the combustion chamber in the gaseous phase, minimizing the size of the ash handling equipment needed in the biomass boiler.

ST is much greater than the average of the hardwood. This is expected to help minimize the impact of slagging on the combustion chamber walls. The elevated ST is likely related to the relatively high iron and calcium content in the ash. The ash fusion temperature is important to boiler operations and efficiency.

From an air pollution control standpoint, $NO_x$ formation (specifically fuel $NO_x$) is expected to be minimal as the nitrogen content of the lignin is very low. The same is true for particulate matter (PM).

Overall, the results indicate that the cellulose hydrolysis-derived lignin has fuel properties that will allow it to be effectively combusted in a process boiler. In particular, the HHV, % volatile matter, spherical temperature (ST), and ash mineral oxide concentrations are particularly conducive for lignin being used as a boiler fuel.

When ranges are used herein for physical properties, such as molecular weight, or chemical properties, such as chemical formulae, all combinations, and subcombinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A composition comprising,
   lignin;
   wherein said composition has an ash content of less than about 0.5 wt. %;
   wherein said ash comprises at least about 18 wt. % Ca as CaO; and
   wherein said ash comprises at least about 22 wt. % Fe as $Fe_2O_3$.

2. The composition of claim 1,
   wherein said composition has a heating value of at least about 7,500 BTU/lb at 15% moisture content.

3. The composition of claim 1,
   wherein said composition has a moisture content of about 5% to about 30%.

4. The composition of claim 1,
   wherein said composition comprises less than about 0.15% N, as measured in an ultimate analysis.

5. The composition of claim 1,
   wherein said composition comprises less than about 0.02% S, as measured in an ultimate analysis.

6. The composition of claim 1,
   wherein said ash comprises about 29 wt. % Si as $SiO_2$.

7. The composition of claim 1,
   wherein said ash comprises about 13 wt. % S as $SO_3$.

8. The composition of claim 1,
   wherein said ash comprises about 1 wt. % P as $P_2O_5$.

9. The composition of claim 1, wherein said composition has a softening temperature of at least about 1172° C., as measured in an oxidizing atmosphere.

10. The composition of claim 1, wherein said lignin has a particle size less than about 500 microns.

11. The composition of claim 1, wherein said lignin has a particle size less than about 50 microns.

12. The composition of claim 1, wherein said lignin has a particle size of about 10 microns to about 30 microns.

13. The composition of claim 1, wherein said composition is substantially free of organic solvent.

14. The composition of claim 1, wherein said composition is used as a fuel.

15. The composition of claim 14, wherein, when said composition is used as a fuel in a combustion chamber, said composition has a softening temperature of about 35° C. to about 65° C. above a flue gas temperature peak at an exit of the combustion chamber.

16. The composition of claim 1, wherein, in a proximate analysis, said composition has greater than 55 wt. % volatile matter.

17. The composition of claim 1, wherein said lignin is processed from lignocellulosic biomass using supercritical or near critical fluid extraction.

18. The composition of claim 17, wherein said supercritical or near critical fluid comprises water.

* * * * *